United States Patent [19]

Hestermann et al.

[11] 4,337,092

[45] Jun. 29, 1982

[54] CORROSION-INHIBITING PIGMENT AND PAINT COMPOSITION

[75] Inventors: Klaus Hestermann, Erftstadt; Alexander Maurer, Hürth-Knapsack; Joachim Kandler, Erftstadt; Gerhard Mietens, Hürth-Knapsack; Herbert Beumling, Bergisch-Gladbach, all of Fed. Rep. of Germany

[73] Assignee: Hoechst Aktiengesellschaft, Fed. Rep. of Germany

[21] Appl. No.: 193,550

[22] Filed: Oct. 3, 1980

[30] Foreign Application Priority Data

Oct. 8, 1979 [DE] Fed. Rep. of Germany ....... 2940695

[51] Int. Cl.$^3$ ............................................... C09D 5/08
[52] U.S. Cl. ............................ 106/14.05; 106/14.39; 106/14.44; 106/296; 106/306
[58] Field of Search ...................... 106/306, 14.05, 296

[56] References Cited

U.S. PATENT DOCUMENTS 3,630,952 12/1971 Nielsen ................................. 106/306
3,669,699 6/1972 Doi ...................................... 106/74

FOREIGN PATENT DOCUMENTS 2458706 6/1975 Fed. Rep. of Germany .
990167 4/1965 United Kingdom .

Primary Examiner—Lorenzo B. Hayes
Attorney, Agent, or Firm—Connolly and Hutz

[57] ABSTRACT

The invention relates to a corrosion-inhibiting active pigment for use in the surface protection of iron and iron alloys. The pigment consists of a mixture of calcium hydrogen phosphate dihydrate, magnesium hydrogen phosphate trihydrate and zinc oxide. More specifically, the mixture contains 2 to 98 weight % of ZnO and 98 to 2 weight % of phosphate components. These in turn contain 3 to 97 weight % of $CaHPO_4 \cdot 2 H_2O$ and 97 to 3 weight % of $MgHPO_4 \cdot 3 H_2O$. The active pigment is suitable for use in painting compositions or lacquers.

5 Claims, No Drawings

CORROSION-INHIBITING PIGMENT AND PAINT COMPOSITION

The present invention relates to an active pigment inhibiting the corrosion of iron and iron alloy surfaces.

It has long been known that painting or coating compositions which are based on a binder and contain metal phosphate as a protective pigment can be applied to the surfaces of iron or iron alloy articles so as to avoid corrosion in contact with the atmosphere. A pigment based on calcium phosphate and zinc phosphate has been disclosed in British Patent Specification No. 915 512, and a pigment prepared from a mixture of calcium phosphate and zinc oxide has been disclosed in British Patent Specification No. 990 167. Further corrosion-inhibiting pigments which are based on magnesium phosphates, and more esecially on trimagnesium orthophosphate, have been described in German Patent Specification "Offenlegungsschrift" 24 58 706. A still further corrosion-inhibiting pigment based on acid magnesium phosphate which may be used in admixture with an aluminium paste has been described in Patent Specification (German Democratic Republic) No. 114 423.

Nontoxic corrosion-inhibiting pigments which are based on phosphates are, however, unable to produce the good corrosion-inhibiting effects typical of toxic pigments, such as red lead or metal chromates, especially zinc chromates. These latter pigments are, however, not fully satisfactory in respect of the following points: Undesirable pores are liable to form in the weld seams of surface-treated iron or iron alloy articles. In addition to this, grinding and welding operations are liable to entail conversion of the lead and also of the chromate compounds to dusty material so that it is obligatory for these compounds to be processed with the use of dust-exhausting means, for medicinal reasons.

Still further, anhydrous pigments do not necessarily ensure the low electric resistance so desirable in modern spot welding.

Mixtures of calcium hydrogen phosphate dihydrate and magnesium hydrogen phosphate trihydrate described in unpublished German Patent Application Nos. P 28 49 712.3 and P 29 16 029.0 filed earlier, have been found to produce a corrosion-inhibiting effect approaching that which is produced by toxic red lead and zinc chromate.

Despite this, it is highly desirable further to improve the corrosion-inhibiting properties of these phosphate pigments.

It is therefore an object of the present invention to provide a nontoxic highly efficient corrosion-inhibiting pigment which is easy to apply as a protective coating to the surfaces of iron or iron alloy articles and which does not adversely affect welding operations by the formation of dust hazardous to health.

In accordance with our present invention, we have unexpectedly found that the good corrosion-inhibiting effect of phosphate mixtures consisting of 3 to 97 weight% $MgHPO_4.3H_2O$ and 97 to 3 weight% $CaHPO_4.2H_2O$, disclosed earlier in unpublished German Patent Application Nos. P 2849712.3 and P 2916029.0, can be improved by using these phosphates in admixture with zinc oxide (ZnO). A pigment mixture of $MgHPO_4.3H_2O$, $CaHPO_4.2H_2O$ and ZnO has corrosion-inhibiting properties which compare favorably with those of products consisting of $MgHPO_4.3H_2O$ and $CaHPO_4.2H_2O$, or ZnO alone.

The unexpected synergetic effect of a pigment composed of $MgHPO_4.3H_2O$, $CaHPO_4.2H_2O$ and ZnO remains practically unaffected by the mixing ratio, which may vary within wide limits, selected for making the pigment mixture.

The present invention relates more particularly to an active pigment inhibiting the corrosion of iron and iron alloy surfaces, the pigment comprising a mixture of calcium hydrogen phosphate dihydrate, magnesium hydrogen phosphate trihydrate and zinc oxide, the mixture containing 2 to 98 weight% ZnO and 98 to 2 weight% of phosphate components, of which in turn 3 to 97 weight% is $CaHPO_4.2H_2O$ and 97 to 3 weight% is $MgHPO_4.3H_2O$.

The corrosion-inhibiting active pigment of this invention contains more preferably 10 to 50 weight% ZnO and 90 to 50 weight% of phosphate components, of which 65 to 95 weight% should be $CaHPO_4.2H_2O$ and 35 to 5 weight% should be $MgHPO_4.3H_2O$.

The invention also relates to a painting composition or lacquer for use in the surface protection of iron and iron alloys, the composition or lacquer containing the novel corrosion-inhibiting active pigment of this invention. It is preferable for the painting composition or lacquer to contain, as total pigment, 5 to 100 weight% of the active pigment and up to 95 weight% of a commercial pigment extender or filler. It is also preferable for the painting composition or lacquer to contain the total pigment in a pigment volume concentration of 10 to 60 volume%, more preferably 20 to 40 volume%. The term pigment volume concentration as used herein denotes the ratio of pigment volume and filler volume to the total volume of all non-volatile constituents of the painting composition or lacquer.

The corrosion-inhibiting active pigments of the present invention are suitable for use in painting compositions, such as in air-drying compositions or in baking lacquers for the surface protection of iron and iron-alloy articles, the compositions or lacquers being used in admixture with customary binders, solvents, pigment extenders (fillers), and color-improving agents.

Useful binders comprise, e. g. drying oils and self-hardening resins. Commercially available customary pigment extenders, also termed fillers, including barites, talc, titanium dioxide, alkaline earth metal carbonates or wollastonite. The color improving agents which are normally used in this art do substantially not affect the corrosion-inhibiting properties of the present pigments. They comprise, for example: asbestines or procelaine clay for inhibiting the deposition of solid matter, antimony oxide for inhibiting chalking, ethylmethylketoxime for inhibiting skinning, and diatomaceous earth for promoting the spreading out of the painting composition.

It has also been found that the present corrosion-inhibiting pigments have no inherent coloration which would adversely affect the coloration of the compositions made therefrom.

The active pigments of the present invention and comparative pigments were applied to sheet metal specimens and the specimens were subjected to the following short time tests: Salt Spray Test (ASTM B 117-64; briefly referred to as SST hereinafter); Condensed Moisture Test (DIN 50017; DIN stands for German Industrial Standard; this test is briefly referred to as CWT hereinafter); Kesternich Test (DIN 50018; briefly to as KT hereinafter). The specimens so tested were inspected for: degree of corrosion (rust) (European scale for determining the degree of corrosion of anticorrosive paints-obtainable upon request from "Fédération Nationale des Industries des Peintures, Vernis, Encres d'Imprimerie et Couleurs fines, 42, Av. Marceau, 75008 Pairs, France"); degree of blister formation (DIN 53 209); and corrosion of metal underlying pigment of a cross-scratched specimen. The standardized magnitudes defining the degree of corrosion and formation of blisters, and the corrosion depth (in millimeters) of the base or underlying metal were assigned an evaluation score (ES) of 0 to 100. More specifically, the score (decreasing from 100 to 0) assigned to the individual specimens was the lower the more serious the degree of corrosion or blister formation or corrosion of the base or underlying metal. Each of the above three tests provides for a maximum score of 300 to be assigned to a 100% corrosion-proof specimen.

In order to assign a numerical value to the efficiency of the present corrosion-inhibiting pigment, the three evaluation scores (ES) are converted to a single characteristic value (CV). The salt spray test is the best to reveal the protective efficiency under long term outdoor conditions. This is the reason why the salt spray test is assigned the factor 2 in calculating the characteristic value in accordance with the following formula:

$$CV = \frac{2 \cdot ES\,(SST) + ES\,(CWT) + ES\,(KT)}{1200} \cdot 100$$

As can be seen, a pigment affording a 100% corrosion-proof effect is assigned a maximum characteristic value of 100.

The following Examples illustrate the invention:

EXAMPLES 1 TO 5

The following materials were made into a homogenized primer with the use of an agitator-provided mixer.

| | Parts by wgt |
|---|---|
| Binder: | |
| Alkyd resin (ALFTALATE AF 342; this is a registered Trade Mark of HOECHST AKTIENGESELLSCHAFT, Frankfurt/M, Germany) | 38.0 |
| Solvents: | |
| Ethyl glycol | 4.0 |
| white spirit | 4.0 |
| n-butanol | 0.5 |
| Color improving agents: | |
| Antiskinning agent (ethylmethyl-ketoxime; ADDITOL XL 297; this is a registered Trade Mark of HOECHST AKTIENGESELLSCHAFT, Frankfurt/M) | 0.5 |
| Dimethyl-dioctadecyl-ammonium montmorillonite (BENTONE 34, 10%; this is a registered Trade Mark of NL Industries Inc., New York, USA) | 1.0 |
| Pigment extenders (Fillers): | |
| Talc | 3.2 |
| Barium sulfate | 4.6 |
| Titanium dioxide | 4.8 |
| Active pigment ($CaHPO_4 \cdot 2H_2O$ + $MgHPO_4 \cdot 3H_2O$ + ZnO) | 5.2 |

On the basis of the above formulation, various primers with a pigment volume concentration of 20 were made by varying the quantitative composition of the active pigment. The corrosion test results are indicated in the following Table 1.

TABLE 1

| Example | Weight % proportion in active pigment | | | Characteristic value |
|---|---|---|---|---|
| | $CaHPO_4 \cdot 2H_2O$ | $MgHPO_4 \cdot 3H_2O$ | ZnO | |
| 1 | 77.6 | 2.4 | 20.0 | 81 |
| 2 | 72.0 | 8.0 | 20.0 | 88 |
| 3 | 64.0 | 16.0 | 20.0 | 89 |
| 4 | 52.0 | 28.0 | 20.0 | 85 |
| 5 | 2.4 | 77.6 | 20.0 | 81 |

EXAMPLES 6 TO 22

The following materials were homogenized as described in Examples 1 to 5:

| | Parts by wgt |
|---|---|
| Binder: | |
| Alkyd resin ALFTALATE AF 342; this is a registered Trade Mark of HOECHST AKTIENGESELLSCHAFT, Frankfurt/M) | 38.0 |
| Solvents: | |
| Ethyl glycol | 4.0 |
| white spirit | 4.0 |
| n-butanol | 0.5 |
| Color improving agents: | |
| Antiskinning agent (ethyl-methyl-ketoxime; ADDITOL XL 297; this is a registered Trade Mark of HOECHST AKTIENGESELLSCHAFT, Frankfurt/M) | 0.5 |
| Dimethyl-dioctadecyl-ammonium montmorillonite (BENTONE 34, 10%; this is a registered Trade Mark of NL Industries Inc., New York, USA) | 1.0 |
| Pigment extenders (Fillers): | |
| Talc | 10.0 |
| Barium sulfate | 11.0 |
| Titanium dioxide | 13.0 |
| Active pigment ($CaHPO_4 \cdot 2H_2O$ + $MgHPO_4 \cdot 3H_2O$ + ZnO) | 18.0 |

On the basis of the above formulation, various primers with a pigment volume concentration of 36 were made by varying the quantitative composition of the active pigment. The corrosion test results are indicated in the following Table 2.

EXAMPLE 23: (COMPARATIVE EXAMPLE)

The formulation was as in Examples 6 to 22 save that zinc phosphate ($Zn_3(PO_4)_2 \cdot 2H_2O$) was used as the active pigment. A pigment volume concentration of 36 was established. The result obtained is indicated in the following Table 2.

EXAMPLE 24: (COMPARATIVE EXAMPLE)

The formulation was as in Examples 6 to 22 save that zinc oxide (ZnO) was used as the active pigment. A pigment volume concentration of 36 was established. The result obtained is indicated in the following Table 2.

EXAMPLE 25: (COMPARATIVE EXAMPLE)

The formulation was as in Examples 6 to 22 save that a mixture of $CaHPO_4 \cdot 2H_2O$ and $MgHPO_4 \cdot 3H_2O$ in a ratio by weight of 60:40, which was free from zinc oxide was used as the active pigment. A pigment volume concentration of 36 was established. The result obtained is indicated in the following Table 2.

TABLE 2

| Example | Weight proportion in active pigment | | | | Characteristic value |
|---|---|---|---|---|---|
| | CaHPO$_4$·2H$_2$O | MgHPO$_4$·3H$_2$O | ZnO | 2H$_2$O | |
| 6 | 87.3 | 2.7 | 10.0 | — | 82 |
| 7 | 81.0 | 9.0 | 10.0 | — | 90 |
| 8 | 72.0 | 18.0 | 10.0 | — | 88 |
| 9 | 58.5 | 31.5 | 10.0 | — | 85 |
| 10 | 2.7 | 87.3 | 10.0 | — | 81 |
| 11 | 77.6 | 2.4 | 20.0 | — | 82 |
| 12 | 72.0 | 8.0 | 20.0 | — | 91 |
| 13 | 64.0 | 16.0 | 20.0 | — | 92 |
| 14 | 52.0 | 28.0 | 20.0 | — | 89 |
| 15 | 2.4 | 77.6 | 20.0 | — | 81 |
| 16 | 48.5 | 1.5 | 50.0 | — | 81 |
| 17 | 45.0 | 5.0 | 50.0 | — | 89 |
| 18 | 40.0 | 10.0 | 50.0 | — | 87 |
| 19 | 32.5 | 17.5 | 50.0 | — | 90 |
| 20 | 1.5 | 48.5 | 50.0 | — | 79 |
| 21 | 88.2 | 9.8 | 2.0 | — | 81 |
| 22 | 1.6 | 0.4 | 98.0 | — | 79 |
| 23 | — | — | — | 100 | 65 |
| 24 | — | — | 100.0 | — | 72 |
| 25 | 60.0 | 40.0 | — | — | 71 |

We claim:

1. A corrosion-inhibiting active pigment for use in the surface protection of iron and iron alloys consisting essentially of a mixture of calcium hydrogen phosphate dihydrate, magnesium hydrogen phosphate trihydrate and zinc oxide, the mixture containing 2 to 98 weight% of ZnO and 98 to 2 weight% of phosphate components, of which 3 to 97 weight% is CaHPO$_4$·2H$_2$O and 97 to 3 weight% is MgHPO$_4$·3H$_2$O.

2. A corrosion-inhibiting pigment of claim 1, wherein the mixture contains 10 to 50 weight% of ZnO and 90 to 50 weight% of phosphate components, of which 65 to 95 weight% is CaHPO$_4$·2H$_2$O and 35 to 5 weight% is MgHPO$_4$·3H$_2$O.

3. In a paint or lacquer composition for use in the surface protection of iron and iron alloys from corrosion containing a film-forming binder, solvent and a corrosion-inhibiting active pigment; the improvement comprising, as said pigment, the composition of claim 1.

4. A paint or lacquer composition of claim 3, in which the total pigment proportion consists to an extent of 5 to 100 weight% of active pigment and up to 95 weight% of a pigment extender.

5. A paint or lacquer composition of claim 4, containing the total pigment in a pigment volume concentration of 10 to 60 volume%.

* * * * *